United States Patent [19]

Iwahashi et al.

[11] Patent Number: 4,671,907
[45] Date of Patent: Jun. 9, 1987

[54] METHOD OF MANUFACTURING CARBON MATERIALS

[75] Inventors: Tohru Iwahashi; Yoshihiko Sunami, both of Ibaraki; Tadashi Miyamura, Amagasaki, all of Japan

[73] Assignee: Sumitomo Metal Industries, Inc., Osaka, Japan

[21] Appl. No.: 762,842

[22] Filed: Aug. 6, 1985

[30] Foreign Application Priority Data

Aug. 7, 1984 [JP] Japan .............................. 59-166220
Aug. 23, 1984 [JP] Japan .............................. 59-176200

[51] Int. Cl.⁴ ...................... B29B 11/12; C01B 31/00
[52] U.S. Cl. ................................ 264/29.5; 264/29.6; 264/29.7; 264/101; 264/105; 264/118; 264/344; 423/445
[58] Field of Search ................. 264/29.5, 29.6, 105, 264/101, 330, 118, 344, 122; 423/445

[56] References Cited

U.S. PATENT DOCUMENTS

| | | | |
|---|---|---|---|
| 3,814,642 | 6/1974 | Araki et al. | 156/60 |
| 4,483,840 | 11/1984 | Delhay et al. | 264/29.5 |
| 4,534,920 | 8/1985 | Yoshinaga et al. | 264/29.4 |
| 4,571,317 | 2/1986 | Layden, Jr. et al. | 264/29.7 |
| 4,574,077 | 3/1986 | Uemura et al. | 264/29.2 |

FOREIGN PATENT DOCUMENTS 51-87515  7/1976  Japan .
57-22615  5/1982  Japan .
1496695  12/1977  United Kingdom .

Primary Examiner—Jeffery Thurlow
Attorney, Agent, or Firm—Burns, Doane, Swecker & Mathis

[57] ABSTRACT

A method for the manufacture of high-strength, high-density carbon materials is disclosed. The method comprises the steps of pulverizing a carbonaceous raw material having a carbon content of at least 92% by weight, a volatile content of 7-20% by weight up to 900° C., and linear shrinkage as a molded body of at most 6% during heating up to 500° C. to an average particle diameter of greater than 10 μm and at most 40 μm, followed by molding and baking. An organic fiber after baking in an inert atmosphere at a temperature of at least 400° C. may be mixed with the pulverized carbonaceous raw material.

7 Claims, 2 Drawing Figures

50μm

50 μm

50 μm

METHOD OF MANUFACTURING CARBON MATERIALS

BACKGROUND OF THE INVENTION

The present invention relates to a method of manufacturing high-strength, high-density carbon materials from specific powdered carbonaceous raw materials without use of a binder.

Also, the present invention concerns a method of manufacturing high strength carbon materials reinforced with specific carbon fibers.

Among various carbon materials, high-strength, high-density carbon materials are used in a wide variety of applications, such as for electrodes, carbon materials for use in nuclear reactors, crucibles, heating elements, mechanical seals, sliding members, current collecting elements, and dies for hot pressing.

These high-strength, high-density carbon materials have conventionally been prepared by an extremely complicated and time-consuming technique which comprises the steps of finely pulverizing a carbonaceous material such as coke or graphite to a powder having an average particle diameter of less than 10 $\mu$m, hot kneading the powder with a binder such as coal tar pitch, re-pulverizing, shaping and baking the kneaded material and impregnating the baked body with coal tar pitch or a similar binder followed by re-baking wherein the last two steps of impregnation and re-baking are carried out repeatedly until the bulk density of the resulting carbon material reaches approximately 1.8.

The above-described prior art technique has many problems in addition to its complexity. For example, micropores are formed due to the difference in shrinkage factor between the filler, such as coke or graphite, and the binder, the pores inherently present in the filler remain after baking, additional pores are formed by vaporization of volatile substances contained in the binder, and oxidation of the binder tends to make graphitization difficult to some extent. For these reasons, the manufacture of high-strength, high-density carbon materials is difficult and their manufacturing costs are considerably high.

Various attempts have been made in the art to obtain less expensively high-strength, high-density carbon materials of good quality, e.g., those having a strength of 700 kg/cm² or higher and a bulk density of 1.9 g/cc or higher.

It has been proposed in Japanese Patent Publication No. 53-18359 that a carbonaceous raw material having a specific hydrogen-to-carbon atomic ratio, quinoline-soluble content, degree of heat distortion shrinkage and degree of carbonization be finely pulverized to an average particle diameter of less than 10 $\mu$m, then shaped and baked for carbonization and graphitization to produce a high-strength, high-density carbon material.

Japanese Laid-Open Patent Application No. 56-22615 discloses a method of preparing a carbonaceous raw material suitable for use in the manufacture of high-strength, high-density carbon materials, which comprises heat-treating a petroleum-derived heavy oil or coal tar pitch and isolating the resulting optically anisotropic microspheres or mesophase particles by solvent precipitation fractionation.

Both of these methods aim to manufacture high-strength, high-density carbon materials in the absence of a binder by using a carbonaceous raw material which serves not only as a filler but as a binder and hence has a self-sintering property, and which is therefore effective for preventing the formation of cracks and pores which may occur during baking.

In the method disclosed in the above Japanese Patent Publication No. 53-18359, a carbon precursor or precarbon which is a porous coke-like carbonized material comprising flow texture phases interspersed with mesophases and which exhibits optical anisotropy as a whole is used to manufacture a high-strength, high-density carbon material and is mechanically pulverized to an average particle diameter of 10 $\mu$m or less. Such pulverization, however, requires a special mill whose operation is time-consuming and expensive. In addition, the use of finely pulverized powder as above does not permit air entrapped in the powder to escape fast enough for the rate of shaping to be increased to a satisfactory level, and the pores through which the gas evolved during baking escapes to the surroundings are also small. Therefore, a considerable pressure develops inside the shaped body during baking, and cracking tends to occur in the resulting baked article.

According to the method disclosed in the aforementioned Japanese Laid-Open Application No. 56-22615, the optically anisotropic microspheres isolated by solvent precipitation fractionation contain internal cracks formed by extraction of some component with the solvent and these internal cracks remain in the resulting carbon material manufactured by shaping and baking the microspheres. It is difficult, therefore, to obtain high-strength, high-density carbon materials using this method.

With respect to high strength carbon materials suitable for use in the above-mentioned applications, it is known to incorporate a carbon fiber reinforcement in carbon products in order to further improve the mechanical and other properties.

Such carbon materials reinforced with carbon fibers have been conventionally manufactured by impregnating a woven fabric of carbon fibers with a thermosetting polymer such as a phenolic resin and, after curing the resin, carrying out baking for carbonization and/or graphitization. In order to further increase the density by filling the pores evolved during baking with the thermosetting resin, the resin impregnation and baking are usually repeated four or five times.

According to such a prior art technique, expensive carbon fibers are incorporated in a high proportion and many steps are involved to obtain the desired product. Thus, the resulting reinforced carbon materials are extremely expensive so that they can be used in limited industrial fields such as the aircraft and space industries and are not suitable for use in common industries.

In order to minimize the number of steps, it has been proposed to manufacture carbon fiber-reinforced carbon material without an impregnation procedure. For example, Japanese Patent Publication No. 49-29281 discloses a method in which specific organic fibers are added to an inorganic or carbon filler and an organic binder before baking. Japanese Laid-Open Patent Application No. 51-87515 discloses a method comprising kneading a carbon powder and a binder with carbon fibers (including graphite fibers) the surfaces of which have been wetted with a liquid carbonaceous binder, followed by shaping and baking.

Although the carbon fibers employed in these methods are specially defined or treated so as to adapt them to use without need of impregnation treatment, there are many problems with these methods. In the method of Japanese Patent Publication No. 49-29281, the inorganic or carbon filler in the form of coarse particles causes the valuable carbon fibers to break into powders during kneading and shaping procedures. According to the method of Japanese Laid-Open Patent Application No. 51-87515, it is essential to thoroughly wet the surfaces of the individual carbon fibers with a carbonaceous binder before kneading, and many microcracks are formed in the baking stage because of different shrinkage factors of the carbon fibers, carbon powder, and organic binder. For these reasons, even in the case of carbon fiber-reinforced carbon materials, a product having a flexural strength of higher than 700 kg/cm$^2$ can not be obtained by any method known in the art.

SUMMARY OF THE INVENTION

It is an object of the present invention to overcome the above-mentioned problems encountered in the prior art methods of manufacturing high-strength, high-density carbon materials.

Another object of the invention is to provide a method of manufacturing high-strength, high-density carbon materials from a self-sintering carbonaceous material capable of being shaped and sintered without addition of a binder and having a relatively coarse particle size in the range of 10 to 40 $\mu$m in average particle diameter so as to minimize formation of cracks during baking.

A further object of the invention is to provide a method of manufacturing high strength carbon fiber-reinforced carbon materials having a flexural strength of 700 kg/cm$^2$ or higher without requiring an impregnation procedure and without powdering the carbon fibers incorporated as a reinforcement.

A still further object of the invention is to provide a method of manufacturing high strength carbon fiber-reinforced carbon materials which causes minimized formation of pores caused by gas evolution incidental to partial decomposition of the carbon fibers and carbon powder in the baking stage and which prevents the formation of microcracks attributable to the difference in shrinkge factor between the two materials.

The present inventors investigated the relationship between the quality of carbonaceous materials and the shrinkage behavior and the development of cracks within the particles of a molded material during heating. As a result of these investigations, the following discoveries were made. (Hereinbelow, unless otherwise indicated, % refers to % weight).

A raw material having a carbon content of at least 92% by weight, a volatile content of 7-13% or 7-20% up to 900° C., and linear shrinkage of at most 6% during heating up to 500° C. has the following characteristics.

(i) Graphitization and achieving a high density are easy.

(ii) It possesses autohesive (self-sintering) properties, and it does not develop internal foams.

(iii) It does not develop internal cracks.

Accordingly, even if a relatively coarse carbon powder with an average particle diameter of 10-40 $\mu$m is molded and sintered, the problems of the above-described materials prepared according to the prior art methods do not occur, and high-strength, high-density carbon materials can be manufactured.

Furthermore, when reinforcing carbon fibers are utilizied since the present invention uses self-sintering carbon powders possessing the above-described characteristics, kneading is unnecessary, and the breaking up of the fibers into powder can be prevented. In addition, as carbon powder with a particle diameter of 10-40 $\mu$m is used, at the time of molding, there is no breakup of the fibers into powders. Also, in this case, the raw materials for molding comprise 2 substances, the carbon powder and the carbon fibers, and the carbon fibers have previously undergone heat treatment at 400° C. or above. Accordingly, during baking there is no difference in the rate of shrinkage between the two, there is little generation of decomposition gas, and almost no minute cracks or pores develop. Accordingly, primarily for these reasons, the carbon fibers can produce ample reinforcing effects, and high-strength carbon materials having a bending strength of at least 700 kg/cm$^2$ can be easily obtained.

Thus, the present invention is a method for manufacturing high-strength, high-density carbon materials comprising the steps of pulverizing to an average particle diameter of greater than 10 $\mu$m and at most 40 $\mu$m a raw material having a carbon content of at least 92% by weight, a volatile content up to 900° C. of 7–20% by weight and preferably 7–13% by weight, and a linear shrinkage as a molded body of at most 6% when heated up to 500° C., molding, and then baking the resulting carbon powder.

According to another aspect, the present invention is method for manufacturing high-strength carbon materials having a bending strength of at least 700 kg/cm$^2$ comprising the steps of heating organic fibers in an inert gas atmosphere at a temperature of at least 400° C., mixing the heat treated fiber ( with a carbon powder having a carbon content of at least 92% by weight, a volatile content up to 900° C. of 7–20% by weight, and linear shrinkage as a molded body of at most 6% when heated up to 500° C., molding the mixture without using a binder, and baking.

DETAILED DESCRIPTION OF THE PREFERRED EMBODIMENTS

Figure 1:
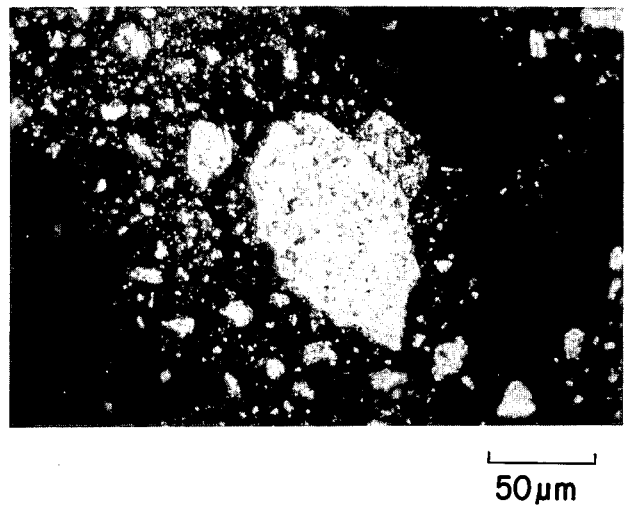
FIG. 1 is a polarized electromicrograph showing a sectional view of the microstructure of carbon powder obtained by pulverizing a carbonaceous raw material to about 100 $\mu$m and baking the powder at 1000° C., the raw material having a linear shrinkage of 6% or less measured on a molded article thereof heated to 500° C.

As already mentioned, in accordance with the present invention, a special carbonaceous raw material is employed. However, as long as the characteristics required for the present invention are satisfied, there are no restrictions on the method of manufacturing the raw material.

For example, a carbonaceous raw material like that described above can be obtained by heating coal tar pitch to 400°–530° C. under a reduced pressure of 10–70 Torr, thereby increasing the carbon content and eliminating the low-molecular component and the decomposed component. It is also possible to use other methods, such as a method wherein after heat treatment under atmospheric pressure, elution treatment with an aromatic solvent such as benzene, toluene, xylene, decrystallized naphthalene oil, decrystallized anthracene, unrefined benzene, and the like is carried out so as to adjust the volatile content.

However, conventional heat condensation polymerization wherein coal tar pitch or the like is merely heated at 350°–550° C. is insufficient.

The carbon content of a carbonaceous raw material according to the present invention must be at least 92% by weight. If the carbon content is less than 92% by weight, atoms of elements other than carbon inhibit graphitization during baking, and it becomes difficult to achieve a high density. Preferably, the carbon content is 92–96% by weight. The carbon content can be adjusted by varying the treatment time for the above-mentioned heat treatment or solvent eluation treatment. However, by selection of starting raw materials having the appropriate carbon content, the carbon content can be determined in advance.

As for the volatile content up to 900° C., a range of 7–20% is suitable, but if high density is required, a range of approximately 7–13% is preferable. If the volatile content is less than 7%, fusing and coalescence of the particles during baking do not occur, the self-sintering properties are not adequate, and hardening does not take place. On the other hand, if the volatile content exceeds 13%, the softening and fusing of the molded body during baking is excessive, the pores between particles become blocked, and foaming develops due to the generation of large quantities of volatile components from the internal portions of the molded body, with the result that a high density can not be achieved. However, when blending carbon fibers, in order to ensure adhesion between the fibers and the carbon powder, the upper limit for the volatile content can be 20%.

The volatile content can be adjusted by varying the length of the heat treatment or the solvent eluation treatment in the same manner as mentioned above with respect to the adjustment of the carbon content. In this case, if the carbon content increases, the volatile content will decrease.

It is necessary that the linear shrinkage of the molded body during heating up to 500° C. be at most 6%. Herein, "linear shrinkage" refers to the value measured using a test piece taken from a molded body which was molded under a pressure of 2 tons/cm$^2$. If the linear shrinkage exceeds 6%, the shrinkage of the pores within the molded body is large, and it is difficult for volatile substances which are generated up to 500° C. to escape through the pores. Thus, pressure builds up within the molded body, and cracks may occur. The linear shrinkage can be adjusted by controlling the degree of polymerization during heat treatment, for example.

A carbonaceous raw material having the above-described characteristics is pulverized to an average particle diameter of at most 40 μm, generally of greater than 10 μm to at most 40 μm, and preferably of 12–30 μm. If the particle diameter is 10 μm or less, it is difficult for air entrapped during molding to escape, and the speed of molding must be decreased. Moreover, the pores through which gas escapes during baking become small, pressure builds up within the molded body due to the generation of gas, and cracks can easily develop. Furthermore, a special pulverizing machine becomes necessary, and the effort and operating costs are increased.

On the other hand, if the average particle diameter is greater than 40 μm, the density of the molded material can not be increased even by pressure molding, and a high density is difficult to achieve. In addition, in the case where the carbon powder is reinforced with carbon fibers, if the average particle diameter is greater than 40 μm, the previously heat treated carbon fibers are damaged and deteriorate during pressure molding. Not only do they fail to provide a reinforcing effect, but even if pressure molding is carried out, closest packing of the particles is impossible, the adhesion between particles is inadequate, and high-strength carbon materials can not be obtained.

There are no limitations on the pulverizing methods which can be used. Some examples of suitable methods are oscillating ball milling, rotary milling, and hammer milling.

If necessary, organic fibers may be blended as a reinforcing material. Organic fibers which can be used in the present invention are fibers having synthetic high polymers as raw materials such as polyacrylonitrile, rayon, phenolic resins, and the like, or pitch-type fibers having petroleum pitch or coal pitch as raw materials, the above-mentioned organic fibers having been heat treated in an inert gas atmosphere. However, organic fibers which undergo softening or melting during heat treatment should have previously undergone treatment to prevent fusing, i.e., oxidation treatment. If the heat treatment temperature is less than 400° C., after mixing the fibers with the carbon powder according to the present invention, during the baking process, large quantities of decomposition gas are generated by the fibers up to 400° C., and at the same time extremely large shrinkage occurs, with the result that cracks develop between the carbon matrix and the fibers and the reinforcing effect of the fibers is lost. Therefore, the heat treatment temperature of the organic fibers should be at least 400° C.

The length of the fibers can be chosen freely. For example, if the fibers are graphitized fibers which undergo absolutely no shrinkage, short fibers on the order of 1 mm are appropriate, while if a low heat treatment temperature of around 400° C., for example, is used, longer fibers can also be used.

If the baked fibers are long fibers, the fibers and the carbon powder can be mixed by arranging them in alternate layers one on top of another. If short fibers are used, it is necessary only to perform physical mixing. Unlike with conventional methods, it is not necessary to add a binder or to knead for a long period of time.

After the above-described blended raw materials are obtained, they are shaped by molding, by extrusion (after being mixed with fats, oils, or the like to impart flowability), or by other method, after which they are baked in a non-oxidizing atmosphere in order to perform carbonizing and graphitizing, thereby achieving carbon materials of the desired shape. The baking temperature is generally from 1000° to 2800° C.

Next, the present invention will be further explained with respect to a number of examples, which are presented merely for the purpose of illustrating the present invention and do not limit it in any way.

EXAMPLES 1–4

Coal tar and petroleum-type unrefined coke were processed under the conditions listed in the left half of Table 1, and carbonaceous raw materials having the characteristics given in the right half of Table 1 were obtained.

In addition, a number of comparative examples having characteristics outside of those prescribed by the present invention were prepared for the purpose of comparison. The characteristics and treatment methods of the comparative Examples are also shown in Table 1.

carbonization, the materials were heated in an argon atmosphere to 2500° C. at a rate of 10° C. per minute, and graphitized materials were obtained. The characteristics of the resulting materials are shown in Table 2.

TABLE 1

| | | Carbonaceous Raw Material Manufacturing Method | | Characteristics of Carbonaceous Raw Material | | |
|---|---|---|---|---|---|---|
| | | Heat Treatment Conditions | | | | |
| | Treatment Method | Temperature (°C.) | Time (Hr.) | Carbon Content (%) | Volatile Content to 900° C. (%) | Linear Shrinkage to 500° C. (%) |
| Example 1 | Heat Treatment of coal tar at reduced pressure of 50 Torr | 480 | 3 | 93.4 | 11.5 | 4 |
| Example 2 | Heat Treatment of coal tar at reduced pressure of 50 Torr | 500 | 3 | 93.7 | 9.8 | 2 |
| Example 3 | Heat Treatment of coal tar while blowing steam at 600° C. | 460 | 10 | 92.8 | 12.0 | 5 |
| Example 4 | Heat Treatment of coal tar while blowing steam at 600° C. | 500 | 1 | 93.3 | 10.3 | 3 |
| Comparative Example 1 | Heating of coal tar in nitrogen atmosphere | 430 | 20 | 90.5 | 13.5 | 15 |
| Comparative Example 2 | Heating of coal tar in nitrogen atmosphere | 480 | 10 | 91.5 | 11.0 | 10 |
| Comparative Example 3 | Heating of coal tar in nitrogen atmosphere | 530 | 5 | 93.2 | 6.0 | 3 |
| Comparative Example 4 | Petroleum-type raw coke | — | — | 92.2 | 6.7 | 7 |

Next, the carbonaceous raw materials listed in Table 1 were pulverized to an average particle diameter of 10 μm–40 μm with a hammer mill and molded into rectangular blocks (90×50×50 mm) under a pressure of 2 tons/cm$^2$, after which they were placed in a container filled with coke powder and heated to 1000° C. in a nitrogen atmosphere at a rate of 12° C./hour. After Comparative Examples 5 and 6 were prepared using the same starting raw materials and the same method as for Example 1, except that the average particle diameters were outside the bounds prescribed for the present invention. The properties of the resulting carbonized and graphitized materials are shown in Table 3.

TABLE 2

| | Average Particle Diameter (μm) | Molding Pressure (t/cm$^2$) | Properties of Carbonized Material (1000° C.) | | | |
|---|---|---|---|---|---|---|
| | | | Bulk Density (g/cm$^3$) | Shore Hardness (Hs) | Bending Strength (kg/cm$^2$) | Volume Resistivity (μΩcm) |
| Example | | | | | | |
| 1 | 15 | 1.5 | 1.72 | 120 | 1100 | 4500 |
| 2 | 12 | 2.0 | 1.74 | 120 | 1150 | 4000 |
| 3 | 30 | 1.5 | 1.69 | 118 | 1250 | 3500 |
| 4 | 20 | 1.5 | 1.70 | 118 | 1000 | 4000 |
| Comparative Example | | | | | | |
| 1 | 15 | 1.5 | — | — | — | — |
| 2 | 15 | 1.5 | 1.65 | 105 | 650 | 4500 |
| 3 | 15 | 1.5 | 1.35 | 50 | 300 | 6000 |
| 4 | 15 | 1.5 | 1.60 | 90 | 600 | 5000 |

| | Properties of Graphitized Material (2500° C.) | | | | |
|---|---|---|---|---|---|
| | Bulk Density (g/cm$^3$) | Shore Hardness (Hs) | Bending Strength (kg/cm$^2$) | Volume Resistivity (μΩcm) | External Appearance |
| Example | | | | | |
| 1 | 1.96 | 80 | 900 | 1000 | Good |
| 2 | 1.99 | 85 | 1000 | 950 | Good |
| 3 | 1.96 | 85 | 1050 | 900 | Good |
| 4 | 2.00 | 90 | 950 | 1000 | Good |
| Comparative Example | | | | | |
| 1 | — | — | — | — | Foams |
| 2 | 1.85 | 65 | 600 | 2100 | Partial softening and deformation |
| 3 | 1.60 | 45 | 350 | 3200 | Inadequate hardening |
| 4 | 1.80 | 60 | 550 | 1800 | Good appearance but low density |

TABLE 3

| | | | Properties of Carbonized Material (1000° C.) | | | |
|---|---|---|---|---|---|---|
| | Average | Molding | Bulk | Shore | Bending | Volume |

TABLE 3-continued

|  | Particle Diameter (μm) | Pressure (t/cm²) | Density (g/cm³) | Hardness (Hs) | Strength (kg/cm²) | Resistivity (μΩcm) |
| --- | --- | --- | --- | --- | --- | --- |
| Comparative Example | | | | | | |
| 5 | 2 | 1.5 | 1.72 | 110 | 950 | 4000 |
| 6 | 50 | 1.5 | 1.55 | 90 | 600 | 6000 |

| | Properties of Graphitized Material (2500° C.) | | | | |
| --- | --- | --- | --- | --- | --- |
| | Bulk Density (g/cm³) | Shore Hardness (Hs) | Bending Strength (kg/cm²) | Volume Resistivity (μΩcm) | External Appearance |
| Comparative Example | | | | | |
| 5 | 1.90 | 70 | 800 | 1200 | Split into 2 layers |
| 6 | 1.78 | 65 | 520 | 2300 | Good appearance but low density |

As is clear from the results shown in Table 2, the bulk density, the Shore hardness, and the bending strength of the examples of carbonized and graphitized materials obtained according to the method of the present invention were higher than those of the Comparative Examples, while the volume resistivity was lower. Thus, the desired high-strength, high-density carbon materials can be obtained according to the present invention.

Furthermore, as is clear from Table 3, if the average particle diameter is outside of the bounds of 10–40 μm prescribed by the present invention, good results can not be obtained.

Figure 2:
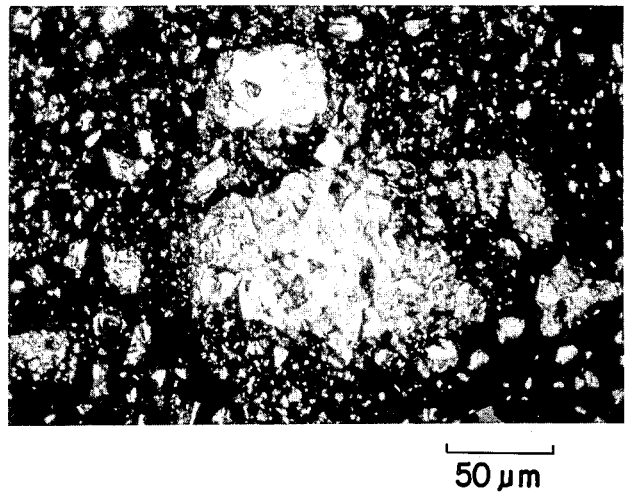
FIG. 2 is a similar polarized electromicrograph of a carbonaceous raw material having a linear shrinkage exceeding 6% as measured in the same manner.

FIG. 1 shows a polarized electromicrograph of the material of Example 1 in which a raw material having a linear shrinkage of 4% as a molded body at the time of heating to 500° C. was pulverized to a particle diameter of 1000 μm and then sintered at 1000° C. Similarly, FIG. 2 is a polarized electromicrograph of the material of Comparative Example 2 in which a raw material having a linear shrinkage of 4% as a molded body at the time of heating to 500° C. was also pulverized to a particle diameter of 1000 μm and then baked at 1000° C. It can be seen that in FIG. 1, there are no internal cracks in the particles, while there are crack within the particles of FIG. 2.

EXAMPLES 5–6

Coal tar pitch was oxidized in air at 350° C., after which it underwent heat treatment under a reduced pressure of 20 Torr at 460° C. The petroleum component generated at this time was eliminated. Table 4 shows the characteristics of the resulting carbonaceous raw material.

TABLE 4

| Carbon Content (wt %) | 92.2 |
| --- | --- |
| Volatile Content Up to 900° C. (wt %) | 14.0 |
| Linear Shrinkage Up to 500° C. (%) | 5.0 |

Next, this carbonaceous raw material was pulverized to an average particle diameter of at most 15 μm to obtain a carbon powder. 3 mm chips of PAN-type fibers which had been previously treated to prevent their melting were subjected to preliminary heating in an inert gas atmosphere, and then 10% by weight of these fibers was mixed with the carbon powder. The resulting mixture was placed in a mold and molded under a pressure of 2 tons/cm² to form disks having a diameter of 90 mm and a thickness of 20 mm. The disks were placed in a container filled with coke powder, heated to 1000° C. at a rate of 10° C./hour in a nitrogen atmosphere, and baked. Next, they were heated in an argon atmosphere to 2000° C. at a rate of 10° C./minute and baked to obtain a graphitized material. The heating conditions and the characteristics of the resulting materials are shown in Table 5. The PAN-type fibers of Examples 5 and 6 underwent preliminary baking prior to mixing with the carbon powder at baking temperatures of at least 400° C., while the PAN-type fibers of Comparative Examples 7 and 8 had preliminary heat treatment temperatures of less than 400° C.

TABLE 5

| | Baking Temperature of PAN-Fibers (°C.) | Properties of Graphitized Material (2000° C.) | | |
| --- | --- | --- | --- | --- |
| | | Bulk density (g/cm³) | Bending Strength (kg/cm²) | Charpy Impact Strength (kg-cm/cm²) |
| Example 5 | 500 | 1.89 | 880 | 6.4 |
| Example 6 | 700 | 1.92 | 1200 | 7.0 |
| Comparative Example 7 | Not Baked | 1.67 | 600 | 2.8 |
| Comparative Example 8 | 300 | 1.70 | 650 | 3.2 |

EXAMPLES 7–9

3 mm chips of PAN-type fibers which had previously undergone treatment to prevent fusion were baked in an inert gas atmosphere at 700° C. After the completion of baking, 10% by weight of the baked fibers was mixed with carbonaceous powders having the characteristics shown in Table 4 and various particle diameters. Examples 7, 8, and 9 had particle diameters of at most 40 μm, and Comparative Examples 9 and 10 had particle diameters of greater than 40 μm. The mixtures were molded and sintered under the same conditions as for Examples 5 and 6 to obtain graphitized materials.

Comparative Example 11 is an example of a material obtained using a conventional method. 20% by weight of coal tar pitch with a softening point of 80° C. was added to 80% by weight of commonly marketed petroleum coke (average particle diameter: 100 μm). Kneading was performed at approximately 120° C., after which 10% by weight of PAN-type fibers previously baked at 700° C. was added, and kneading was continued for 2 more hours. The resulting mixture was put into molds 90 mm in diameter and 20 mm tall while heating at 120° C. and then was molded and baked under the same conditions as for Examples 5 and 6 to obtain a graphitized material.

The characteristics of these examples are shown in Table 6.

TABLE 6

| | Average Particle Diameter of Carbonaceous Raw Material (μm) | Properties of Graphitized Material (2000° C.) | | |
|---|---|---|---|---|
| | | Bulk Density (g/cm$^3$) | Bending Strength (kg/cm$^2$) | Charpy Impact Strength (kg-cm/cm$^2$) |
| Example 7 | 5 | 1.94 | 1250 | 7.0 |
| Example 8 | 15 | 1.92 | 1200 | 7.0 |
| Example 9 | 25 | 1.89 | 1000 | 5.6 |
| Comparative Example 9 | 60 | 1.79 | 540 | 2.8 |
| Comparative Example 10 | 100 | 1.72 | 450 | 2.5 |
| Comparative Example 11 | Petroleum Coke 100 μm | 1.75 | 350 | 2.0 |

What is claimed is:

1. A method for the manufacture of high-strength, high-density carbon materials comprising the steps of: pulverizing a carbonaceous raw material to give a carbon powder having a carbon content of at least 92% by weight, a volatile content of 7-20% by weight up to 900° C., and linear shrinkage as a molded body of at most 6% during heating up to 500° C. to an average particle diameter of greater than 10 μm and at most 40 μm, followed by molding and baking.

2. A method as claimed in claim 1, wherein said volatile content is 7-13% by weight.

3. A method as claimed in claim 1, wherein said carbonaceous raw material is obtained by heating coal tar pitch under a reduced pressure of 10-70 Torr to 400°-530° C., increasing the carbon content, and eliminating the low molecular weight component and the decomposed component.

4. A method as claimed in claim 1, wherein said carbonaceous raw material is obtained by heat treating coal tar pitch under atmospheric pressure, followed by eluting and adjusting the volatile content with an aromatic solvent selected from the group consisting of benzene, toluene, xylene, decrystallized napthalene oil, decrystallized anthracene, and unrefined benzene.

5. A method for the manufacture of high-strength, high-density carbon materials comprising the steps of:
baking an organic fiber in an inert gas atmosphere at a temperature of at least 400° C.;
blending said organic fiber with a carbon powder having a carbon content of at least 92% by weight, a volatile content up to 900° C. of 7-20% by weight, linear shrinkage as a molded body of at most 6% during heating up to 500° C., and an average particle diameter of at most 40 μm;
molding without using a binder; and
after said molding step, baking so as to obtain a high-strength, high-density carbon material with a bending strength of at least 700 kg/cm$^2$.

6. A method as claimed in claim 5, wherein said organic fiber is a fiber having a synthetic high polymer resin selected from polyacrylonitrile, rayon, a phenolic resin, and a pitch-type fiber having petroleum pitch or coal pitch as a raw material, said organic fiber having been baked in an inert gas atmosphere.

7. A method as claimed in claim 6, wherein said organic fiber has previously undergone treatment to prevent fusion.

* * * * *

UNITED STATES PATENT AND TRADEMARK OFFICE
CERTIFICATE OF CORRECTION

PATENT NO.　:　4,671,907
DATED　　　:　June 9, 1987
INVENTOR(S) :　TOHRU IWAHASHI et al It is certified that error appears in the above-identified patent and that said Letters Patent is hereby corrected as shown below:

Title page:

[73] Assignee:   Sumitomo Metal Industries, Ltd.

Signed and Sealed this

Seventeenth Day of November, 1987

*Attest:*

DONALD J. QUIGG

*Attesting Officer*　　　*Commissioner of Patents and Trademarks*